(No Model.)

S. O. PARKER.
SWIVEL BUTTON.

No. 252,509. Patented Jan. 17, 1882.

WITNESSES:
Francis McArdle
C. Sedgwick

INVENTOR:
S. O. Parker
BY Munn & Co
ATTORNEYS.

UNITED STATES PATENT OFFICE.

SILAS O. PARKER, OF LITTLETON, NEW HAMPSHIRE, ASSIGNOR TO THE LITTLETON PATENT BUTTON COMPANY, OF SAME PLACE.

SWIVEL-BUTTON.

SPECIFICATION forming part of Letters Patent No. 252,509, dated January 17, 1882.

Application filed October 29, 1881. (No model.)

*To all whom it may concern:*

Be it known that I, SILAS O. PARKER, of Littleton, in the county of Grafton and State of New Hampshire, have invented a new and Improved Swivel-Button, of which the following is a full, clear, and exact description.

The object of my invention is to prevent the bar of a swivel-button from sliding in the head and to hold it in any desired position, and a further object is to prevent the lower edge of the swiveled eyelet to which the head is attached from chafing and scratching the wrist.

The invention consists in a swivel-button constructed with a tubular shank containing a spiral or other spring which presses upward against the bar passing through the head of the shank, which spring rests on a series of studs formed by pressing part of the shank inward. The shank is held to the material by an outer washer provided with a raised part and by an inner washer provided with a recessed part, whereby the tubular shank will be held properly, and its lower outwardly-turned edge cannot chafe and scratch the wrist.

Reference is to be had to the accompanying drawings, forming a part of this specification, in which similar letters of reference indicate corresponding parts in all the figures.

Figure 1:
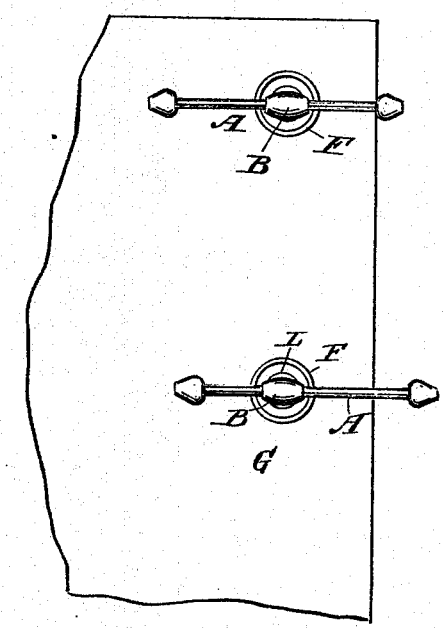
Figure 2:
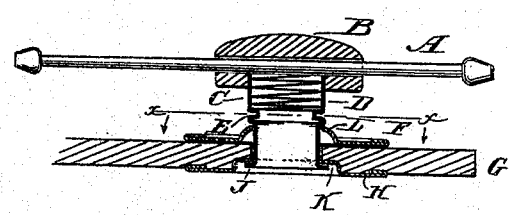
Figure 3:
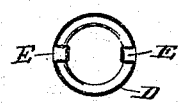

Figure 1 is a plan view of two of my improved swivel-buttons attached to a glove or garment. Fig. 2 is a longitudinal sectional elevation of one of my improved swivel-buttons. Fig. 3 is a sectional plan view of the same on the line $x\ x$, Fig. 2.

The bar A passes loosely through an aperture in the head B of the button; but to prevent the bar from sliding in this head and for the purpose of holding this bar in any desired position a spiral or other suitable spring, C, is placed in the tubular eyelet D, forming the shank of the button, in such a manner that this spring C will press upward against the bar A. The lower end of the spring C rests on a series of indentations, E, made from the outside of the shank or tubular eyelet D—that is, part of the metal of this tubular eyelet is pressed inward to form inner studs on which the spring C can rest. This spring produces sufficient friction to hold the bar A in any desired position and prevents slipping of the bar, and thus also prevents accidental opening of the fastening. The tubular shank D is passed through a washer, F, on the outside of the material G—cloth, &c.—and through a washer, H, on the inner side of the material G, and the lower edge, J, of this eyelet D is bent or turned outward to rest against the outer surface of the inner washer, H, so that the tubular shank will be held to the material, but can be turned.

If the button is used in a glove, the bent edge J of the eyelet is apt to chafe and scratch the wrist, and to prevent this the middle part, K, of this washer H is recessed, so that this edge J will be within the outer surface of the washer, and thus cannot scratch or chafe the wrist. So that the eyelet or shank D will be held firmly, the middle part, L, of the outer washer, F, is raised, and will thus hold the eyelet or shank nearer the head than it could if the washer were flat, and the shank or eyelet will thus be held more firmly.

This button can be used for gloves, shoes, garments, &c.

Having thus described my invention, I claim as new and desire to secure by Letters Patent—

1. In a swivel-button, the combination, with the tubular shank D, of the bar A and the spring C, contained in the tubular shank D, substantially as herein shown and described, and for the purpose set forth.

2. In a swivel-button, the combination, with the tubular shank D, having internal indentations or studs, E, of the bar A and the spring C, contained in the tubular shank D, substantially as herein shown and described, and for the purpose set forth.

SILAS O. PARKER.

Witnesses:
G. W. BARRETT,
A. J. BARRETT.